(12) United States Patent
Kar et al.

(10) Patent No.: US 10,528,950 B2
(45) Date of Patent: Jan. 7, 2020

(54) SYSTEM AND A METHOD FOR DETECTING FRAUDULENT TRANSACTIONS AT A TRANSACTION SITE

(71) Applicant: Cognizant Technology Solutions India Pvt. Ltd., Chennai (IN)

(72) Inventors: Abhishek Kar, Kolkata (IN); Aditya Yadav, Gorakhpur (IN); Akash Bajpai, Thane (IN); Shyam Kumar, Patna (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 257 days.

(21) Appl. No.: 15/726,516

(22) Filed: Oct. 6, 2017

(65) Prior Publication Data
US 2019/0043055 A1     Feb. 7, 2019

(30) Foreign Application Priority Data
Aug. 2, 2017  (IN) .............................. 201741027483

(51) Int. Cl.
*G06Q 20/40*       (2012.01)
*G06K 9/62*        (2006.01)
(Continued)

(52) U.S. Cl.
CPC ..... *G06Q 20/4016* (2013.01); *G06F 16/7867* (2019.01); *G06F 21/552* (2013.01);
(Continued)

(58) Field of Classification Search
None
See application file for complete search history.

(56) References Cited

U.S. PATENT DOCUMENTS

2008/0306980 A1*  12/2008  Brunner ................. A01K 1/031
2010/0059589 A1*   3/2010  Goncalves ......... G06K 9/00771
                                                             235/383
(Continued)

OTHER PUBLICATIONS

Trinh, Hoang, Sharath Pankanti, and Quanfu Fan. "Multimodal ranking for non-compliance detection in retail surveillance." 2012 IEEE Workshop on the Applications of Computer Vision (WACV). IEEE, Jan. 2012 (Year: 2012).*

(Continued)

*Primary Examiner* — Nay A Maung
*Assistant Examiner* — Nathan J Bloom
(74) *Attorney, Agent, or Firm* — Cantor Colburn LLP

(57) ABSTRACT

A system and a method for detecting fraudulent transactions at a transaction site by analyzing pattern of events associated with one or more transactions are provided. The present invention provides for forming a collection of most probable fraudulent patterns and true patterns associated with one or more transactions, selecting a pattern classification technique, generating a data input from an ongoing transaction that is interpretable by the selected pattern classification technique, and effectively and efficiently categorising ongoing transaction into fraudulent and genuine transactions using selected pattern classification technique. The present invention may be utilized in a variety of applications where discrete time-ordered visual events are associated with a transaction, for example: vehicles detected in relation to a transit point, badge or card swipes from an automated door lock etc., which indicate trespassing, theft and unauthorized access to restricted areas etc. with a primary focus on retail shrinkage.

18 Claims, 13 Drawing Sheets

(51) Int. Cl.

| | | |
|---|---|---|
| *G06K 9/00* | (2006.01) | |
| *G06K 9/78* | (2006.01) | |
| *G06F 16/78* | (2019.01) | |
| *G06F 21/55* | (2013.01) | |
| *G06Q 20/20* | (2012.01) | |
| *G07G 1/00* | (2006.01) | |
| *G06Q 20/38* | (2012.01) | |
| *G06N 3/02* | (2006.01) | |

(52) U.S. Cl.
CPC ..... *G06K 9/00335* (2013.01); *G06K 9/00771* (2013.01); *G06K 9/6224* (2013.01); *G06K 9/6267* (2013.01); *G06K 9/78* (2013.01); *G06Q 20/209* (2013.01); *G06Q 20/389* (2013.01); *G07G 1/0081* (2013.01); *G06N 3/02* (2013.01)

(56) References Cited

U.S. PATENT DOCUMENTS

| | | | | |
|---|---|---|---|---|
| 2011/0131105 | A1* | 6/2011 | Aonuma | G06Q 20/20 705/24 |
| 2012/0008836 | A1* | 1/2012 | Bobbitt | G06K 9/00771 382/113 |
| 2012/0140042 | A1* | 6/2012 | Albertson | G08B 13/19613 348/46 |
| 2014/0282856 | A1* | 9/2014 | Duke | H04L 63/20 726/1 |
| 2016/0212158 | A1* | 7/2016 | Gao | H04L 63/1416 |
| 2016/0322078 | A1* | 11/2016 | Bose | G11B 27/031 |
| 2017/0039470 | A1* | 2/2017 | Hirayama | G06N 3/0454 |
| 2017/0238055 | A1* | 8/2017 | Chang | G06F 3/012 725/19 |
| 2017/0289624 | A1* | 10/2017 | Avila | H04N 21/4542 |
| 2018/0268305 | A1* | 9/2018 | Dhondse | G06N 5/04 |
| 2019/0034711 | A1* | 1/2019 | Kayhani | G06K 9/00771 |
| 2019/0034931 | A1* | 1/2019 | Cash | G06Q 20/4016 |
| 2019/0108400 | A1* | 4/2019 | Escorcia | G06K 9/00718 |
| 2019/0205667 | A1* | 7/2019 | Avidan | G06N 20/00 |

OTHER PUBLICATIONS

Noorit, Nattapon, and Nikom Suvonvorn. "Human activity recognition from basic actions using finite state machine." Proceedings of the First International Conference on Advanced Data and Information Engineering (DaEng-2013). Springer, Singapore, 2014 (Year: 2014).*

Florent Fusier, "Video Understanding for Complex Activity Recognition", HAL Id: inria-00276936 https://hal.inria.fr/inria-00276936, May 2, 2008.

Prasad Gabbur, "A pattern discovery approach to retail fraud detection", https://www.researchgate.net/publication/221654009, Aug. 2011.

Sachin Sudhakar Farfade, "Multi-view Face Detection Using Deep Convolutional Neural Networks", Apr. 20, 2015.

* cited by examiner

| True Pattern Substrings |
|---|
| PSBD |
| PBDPD |
| PSBPSD |
| PBSSD |

Table 2

| False Pattern Substrings |
|---|
| PSD |
| PDPD |
| PSPSD |
| PSSD |

Table 1

FIG. 4

| Patterns |
|---|
| PSD |
| PDPD |
| PSPSD |
| PSSD |

Table 1

| Transition Matrix for False Patterns | | | | |
|---|---|---|---|---|
| | P | S | B | D |
| P | 0.05 | 0.8 | 0.00 | 0.15 |
| S | 0.1 | 0.2 | 0.00 | 0.7 |
| B | 0.00 | 0.00 | 0.00 | 0.00 |
| D | 0.6 | 0.25 | 0.00 | 0.15 |

FIG. 5

| Pattern : PSSBPD | | | |
|---|---|---|---|
| P_1 = 1 | S_1= 0 | B_1= 0 | D_1= 0 |
| P_2 = 0 | S_2 = 1 | B_2= 0 | D_2= 0 |
| P_3= 0 | S_3 = 1 | B_3= 0 | D_3= 0 |
| P_4= 0 | S_4= 0 | B_4 = 1 | D_4= 0 |
| P_5 = 1 | S_5= 0 | B_5= 0 | D_5= 0 |
| P_6= 0 | S_6= 0 | B_6= 0 | D_6 = 1 |
| P_7= 0 | S_7= 0 | B_7= 0 | D_7= 0 |
| Count_P=2 | Count_S=2 | Count_B=1 | Count_D=1 |

Table 3

FIG. 6

| Pattern : PSPSD | | | |
|---|---|---|---|
| P_1 = 1 | S_1= 0 | B_1= 0 | D_1= 0 |
| P_2 = 0 | S_2 = 1 | B_2= 0 | D_2= 0 |
| P_3= 1 | S_3 = 0 | B_3= 0 | D_3= 0 |
| P_4= 0 | S_4= 1 | B_4 = 0 | D_4= 0 |
| P_5 = 0 | S_5= 0 | B_5= 0 | D_5= 1 |
| P_6= 0 | S_6= 0 | B_6= 0 | D_6= 0 |
| P_7= 0 | S_7= 0 | B_7= 0 | D_7= 0 |
| Count_P=2 | Count_S=2 | Count_B=0 | Count_D=1 |

Table 3a

FIG. 6A

| Pattern : PSBPSD | | | |
|---|---|---|---|
| P_1 = 1 | S_1 = 0 | B_1 = 0 | D_1 = 0 |
| P_2 = 0 | S_2 = 1 | B_2 = 0 | D_2 = 0 |
| P_3 = 0 | S_3 = 0 | B_3 = 1 | D_3 = 0 |
| P_4 = 1 | S_4 = 0 | B_4 = 0 | D_4 = 0 |
| P_5 = 0 | S_5 = 1 | B_5 = 0 | D_5 = 0 |
| P_6 = 0 | S_6 = 0 | B_6 = 0 | D_6 = 1 |
| P_7 = 0 | S_7 = 0 | B_7 = 0 | D_7 = 0 |
| Count_P=2 | Count_S=2 | Count_B=1 | Count_D=1 |

Table 3b

FIG. 6B

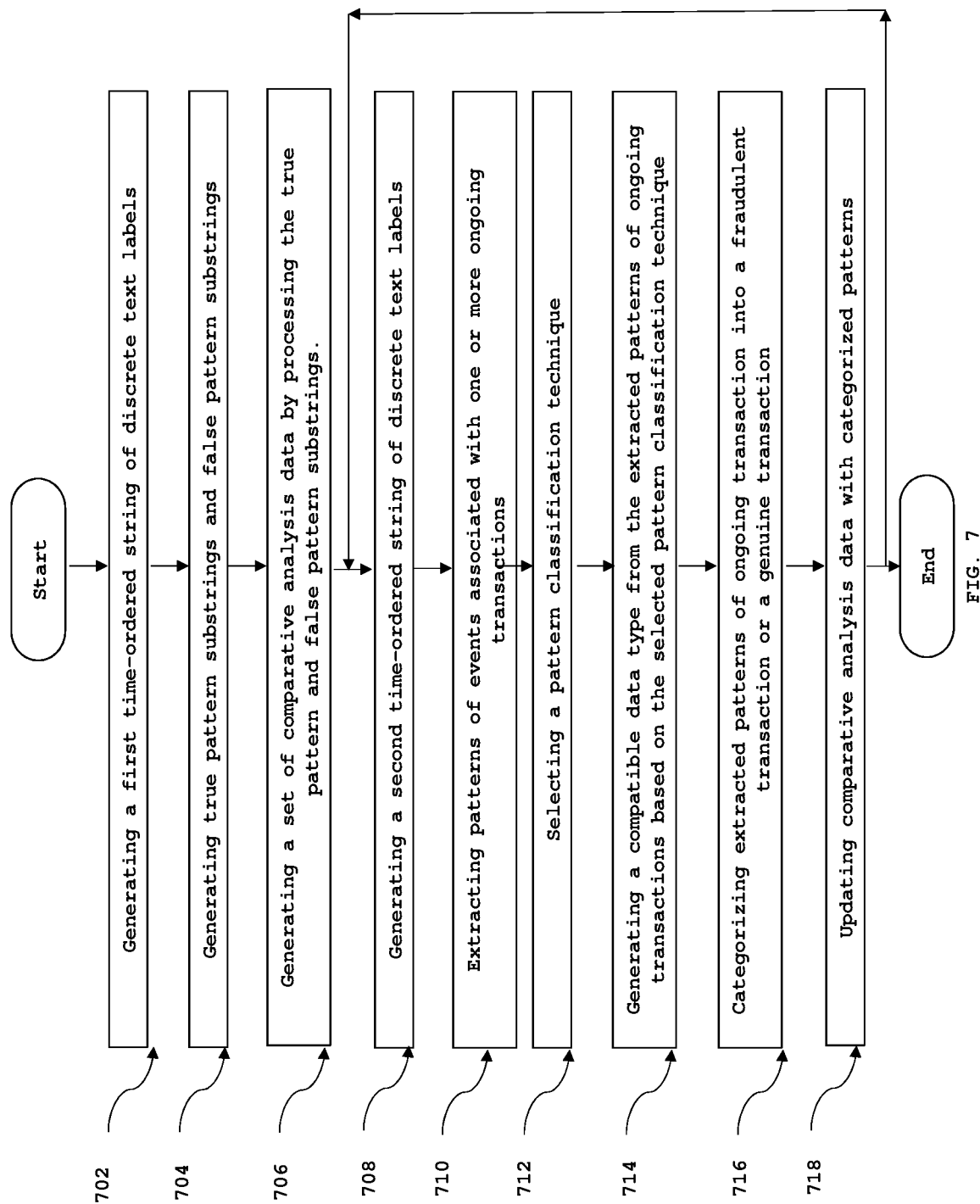

SYSTEM AND A METHOD FOR DETECTING FRAUDULENT TRANSACTIONS AT A TRANSACTION SITE

CROSS REFERENCE TO RELATED APPLICATION

This application is related to and claims the benefit of Indian Patent Application Number 201741027483 filed on Aug. 2, 2017, the contents of which are incorporated herein by reference in their entirety.

FIELD OF THE INVENTION

The present invention relates generally to the field of surveillance and security at various transaction sites. More particularly, the present invention relates to a system and a method to detect fraudulent transactions, by analyzing pattern of events associated with one or more transactions, generating a string of discrete text-labels and employing one or more pattern classification techniques to categorize fraudulent transactions accurately and efficiently and reducing false alarms.

BACKGROUND OF THE INVENTION

Retail shrinkage is becoming a huge problem for retail merchants (e.g., stores). Retail shrinkage can be attributed to factors such as employee theft, shoplifting, fraudulent or unintentional administrative error, vendor fraud, damage in transit or in store, fraudulent or unintentional transactions at the point of sale (POS) (e.g. by the cashier) etc. According to retailers, most incidents of employee theft occur at point of sale (POS) where store staff use fraudulent means to bypass the barcode registration of retail goods. For instance, POS personnel at a POS site in a store may permit an individual (e.g., a friend or family member of the POS personnel) to move through the POS site with retail goods from the store without paying for the goods or after paying a reduced amount for the goods. This causes retail loss for organizations, and further hampers growth of the organization.

Shrinkage loss prevention measures involves some robust processes to detect fraud or theft, often backed by enforcement and recovery. These include video surveillance at POS, installation of theft deterrent devices, EAS alarms at entrances etc. These measures are generally implemented to identify fraudulent transactions by capturing and recording behavior deviations with video systems for subsequent analysis. But, any sort of human review and analysis of video data is time consuming and inefficient when the scale of data becomes large which is inevitable in today's scenario.

Accordingly, detecting and preventing this retail shrinkage may be desirable for retail merchants. Existing techniques to address the problem of retail shrinkage caused by employee theft at a POS uses techniques such as voting mechanism to classify a pattern into either a fraudulent transaction or a genuine one. The voting mechanism involves frequency-based, SVM-based (Support Vector Machines) or a combination of SUV and frequency based techniques. These techniques along with pattern classification techniques are used to classify any new pattern into fraud and genuine classes. However, the voting mechanism based on frequency has been observed to be inaccurate as it causes false alarms, which leads to unnecessary chaos. Further, it has been observed that with existing methods involving use of pattern recognition techniques, incidence of false alarms and inaccurate detection or lack of detection of fraudulent transactions is widespread.

In light of the above drawbacks, there is a need for a system and a method which accurately detects fraudulent transactions at a transaction site. There is also a need for a system and a method which maximizes true detection of any fraud transaction and minimizes any sort of false alarms. Further, there is a need for a system and a method which is capable of analyzing pattern of events associated with one or more transactions in real time using surveillance data and transaction log data and detect fraudulent transactions. Yet further, there is a need for a system and a method which can be easily implemented at a Point of Sale (POS) with concentration on retail shrinkage primarily due to theft of inventory by employees.

SUMMARY OF THE INVENTION

A method for detecting fraudulent transactions which occur at a transaction site is provided. In various embodiments of the present invention, the method is performed by a computation engine interfacing with one or more video surveillance devices and a transaction log database. The computation engine executes instructions stored in a memory via a processor. The method comprises generating, by the computation engine, a first time ordered discrete text label string from video surveillance data and transaction log data associated with one or more previous transactions. The first time-ordered discrete text label string is representative of one or more previous transactions. The method further comprises generating, by the computation engine, one or more true pattern substrings and false pattern substrings by parsing the first time-ordered discrete text label string using a first set of rules. Each true pattern substring represents a successful transaction and each false pattern substring represents a fraudulent transaction. Furthermore, the method comprises generating, by the computation engine, a set of comparative analysis data by processing the true pattern and false pattern substrings. The comparative analysis data is a collection of most probable fraudulent patterns and true patterns associated with a transaction. The method further comprises generating, by the computation engine, a second time-ordered discrete text label string from the video surveillance data and transaction log data associated with one or more ongoing transactions. The second time-ordered discrete text label string is representative of one or more ongoing transactions. Furthermore, the method comprises extracting, patterns of events associated with one or more ongoing transactions from the second time-ordered discrete text label string based on a second set of rules. The method further comprises selecting, by the computation engine, a pattern classification technique based on analysis of complexity of the extracted patterns. Yet further, the method comprises generating, by the computation engine, a compatible data input from the extracted patterns of ongoing transactions based on the selected pattern classification technique. The compatible data input is the data that is interpretable by the selected pattern classification technique. Finally, the method comprises categorizing, by the computation engine, the extracted patterns of ongoing transaction into a fraudulent transaction and a genuine transaction. The categorization is performed based on the comparative analysis data and the compatible data input employed by the selected pattern classification technique.

A system for detecting fraudulent transactions which occur at a transaction site is provided. In various embodiments of the present invention, the system interfaces with one or more video surveillance devices and a transaction log database to receive and process data comprising pattern of events associated with one or more transactions. The system comprises a memory storing program instructions, a processor configured to execute program instructions stored in the memory, and a computation engine in communication with the processor. The computation engine is configured to generate a first time-ordered discrete text label string from video surveillance data and transaction log data associated with one or more previous transactions. The first time-ordered discrete text label string is representative of one or more previous transactions. The computation engine generates one or more true pattern substrings and false pattern substrings by parsing the first time-ordered discrete text label string using a first set of rules. Each true pattern substring represents a successful transaction and each false pattern substring represents a fraudulent transaction. Further, the computation engine generates a set of comparative analysis data by processing the true pattern and false pattern substrings. The comparative analysis data is a collection of most probable fraudulent patterns and true patterns associated with a transaction. Furthermore, the computation engine generates a second time-ordered discrete text label string from the video surveillance data and transaction log data associated with one or more ongoing transactions. The second time-ordered discrete text label string is representative of one or more ongoing transactions. The computation engine extracts patterns of events associated with one or more ongoing transactions from the second time-ordered discrete text label string based on a second set of rules. The computation engine, further selects a pattern classification technique based on an analysis of complexity of the extracted patterns. Yet further, the computation engine is configured to generate a compatible data input from the extracted patterns of ongoing transactions based on the selected pattern classification technique. The compatible data input is the data that is interpretable by the selected pattern classification technique. Finally, the computation engine categorizes the extracted patterns of ongoing transaction into a fraudulent transaction and a genuine transaction, wherein the categorization is performed based on the comparative analysis data and the compatible data input employed by the selected pattern classification technique.

A computer program product is provided. The computer program product comprises a non-transitory computer-readable medium having computer-readable program code stored thereon, the computer-readable program code comprising instructions that, when executed by a processor, cause the processor to generate a first time-ordered discrete text label string from video surveillance data and transaction log data associated with one or more previous transactions. The first time ordered discrete text label string is representative of one or more previous transactions. Further, one or more true pattern substrings and false pattern substrings are generated by parsing the first time ordered discrete text label string using a first set of rules. Each true pattern substring represents a successful transaction and each false pattern substring represents a fraudulent transaction. Furthermore, a set of comparative analysis data is generated by processing the true pattern and false pattern substrings. The comparative analysis data is a collection of most probable fraudulent patterns and true patterns associated with a transaction. Further, a second time ordered discrete text label string is generated from the video surveillance data and transaction log data associated with one or more ongoing transactions. The second time ordered discrete text label string is representative of one or more ongoing transactions. Furthermore, patterns of events associated with one or more ongoing transactions are generated from the second time ordered string of discrete text labels based on a second set of rules. Further, a pattern classification technique is selected based on analysis of complexity of the extracted patterns. Yet further, a compatible data input from the extracted patterns of ongoing transactions is generated based on the selected pattern classification technique. The compatible data input is the data that is interpretable by the selected pattern classification technique. Furthermore, the extracted patterns of ongoing transaction are categorized into a fraudulent transaction and a genuine transaction. The categorization is performed based on the comparative analysis data and the compatible data input employed by the selected pattern classification technique.

BRIEF DESCRIPTION OF THE ACCOMPANYING DRAWINGS

The present invention is described by way of embodiments illustrated in the accompanying drawings wherein:

FIG. 4 shows an example of false pattern substrings (table 1) and true pattern substrings (table 2) generated by the parsing of time ordered string of labels in accordance with an exemplary embodiment of the present invention;

FIG. 5 shows an example of transaction matrix generated from false pattern substrings as illustrated in FIG. 4 table 1 in accordance with an exemplary embodiment of the present invention;

FIG. 6 is an exemplary table (table 3) depicting an example of numeric variables generated from a pattern for implementation in Neural Network model, in accordance with an exemplary embodiment of the present invention;

FIG. 6A is an exemplary table (table 3a) depicting an example of numeric variables generated from a pattern from the false pattern substrings (table 1) for implementation in Neural Network model, in accordance with an exemplary embodiment of the present invention;

FIG. 6B is an exemplary table (table 3b) depicting an example of numeric variables generated from a pattern from the true pattern substrings (table 2) for implementation in Neural Network model, in accordance with an exemplary embodiment of the present invention;

FIG. 7 is a flowchart illustrating a method for detecting fraudulent transactions which occur at a transaction site, in accordance with various embodiments of the present invention;

Figure 2:
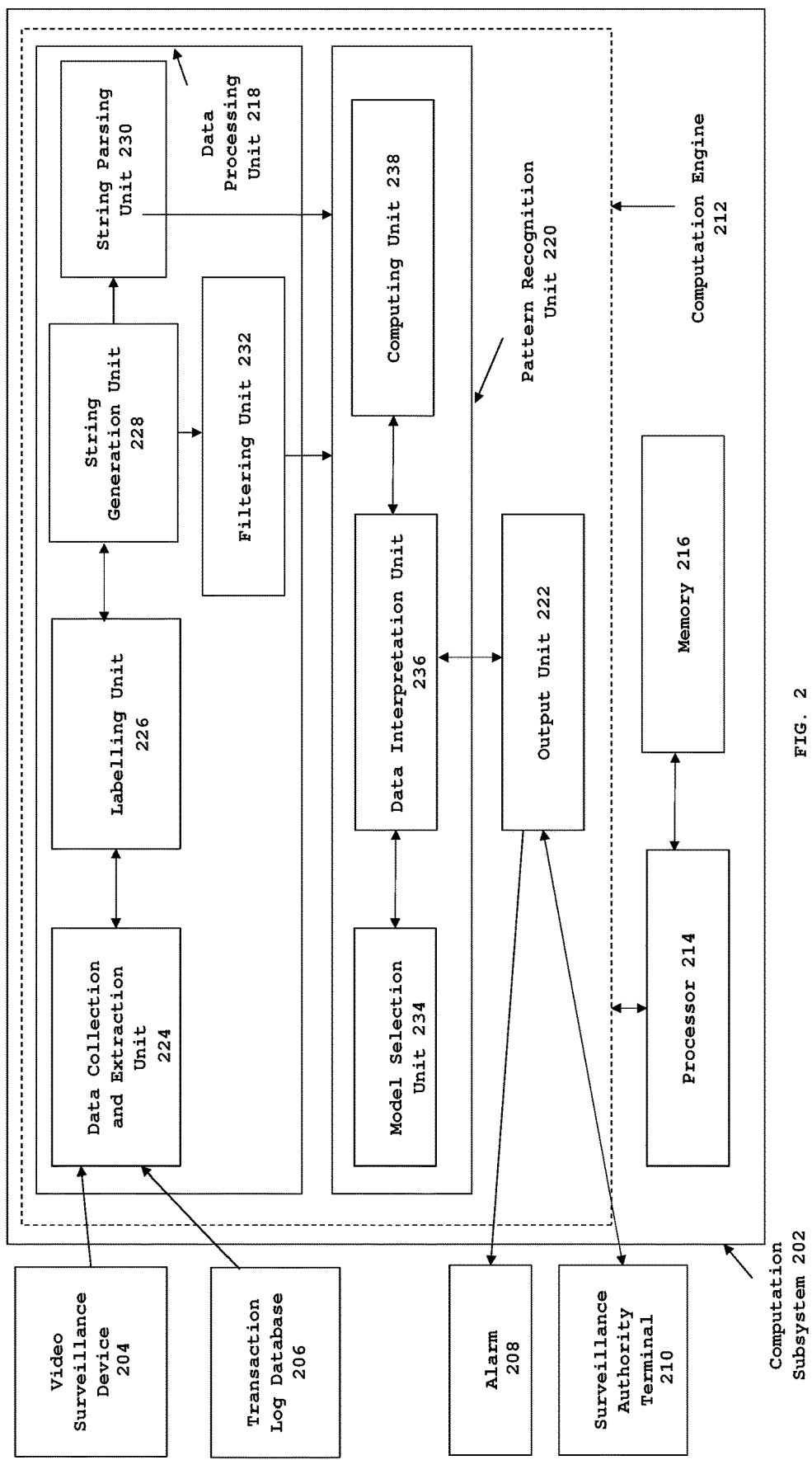
FIG. 2 is a detailed block diagram of the computation subsystem for detecting fraudulent transactions of inventory at a transaction site, in accordance with various embodiments of the present invention.
Figure 8:
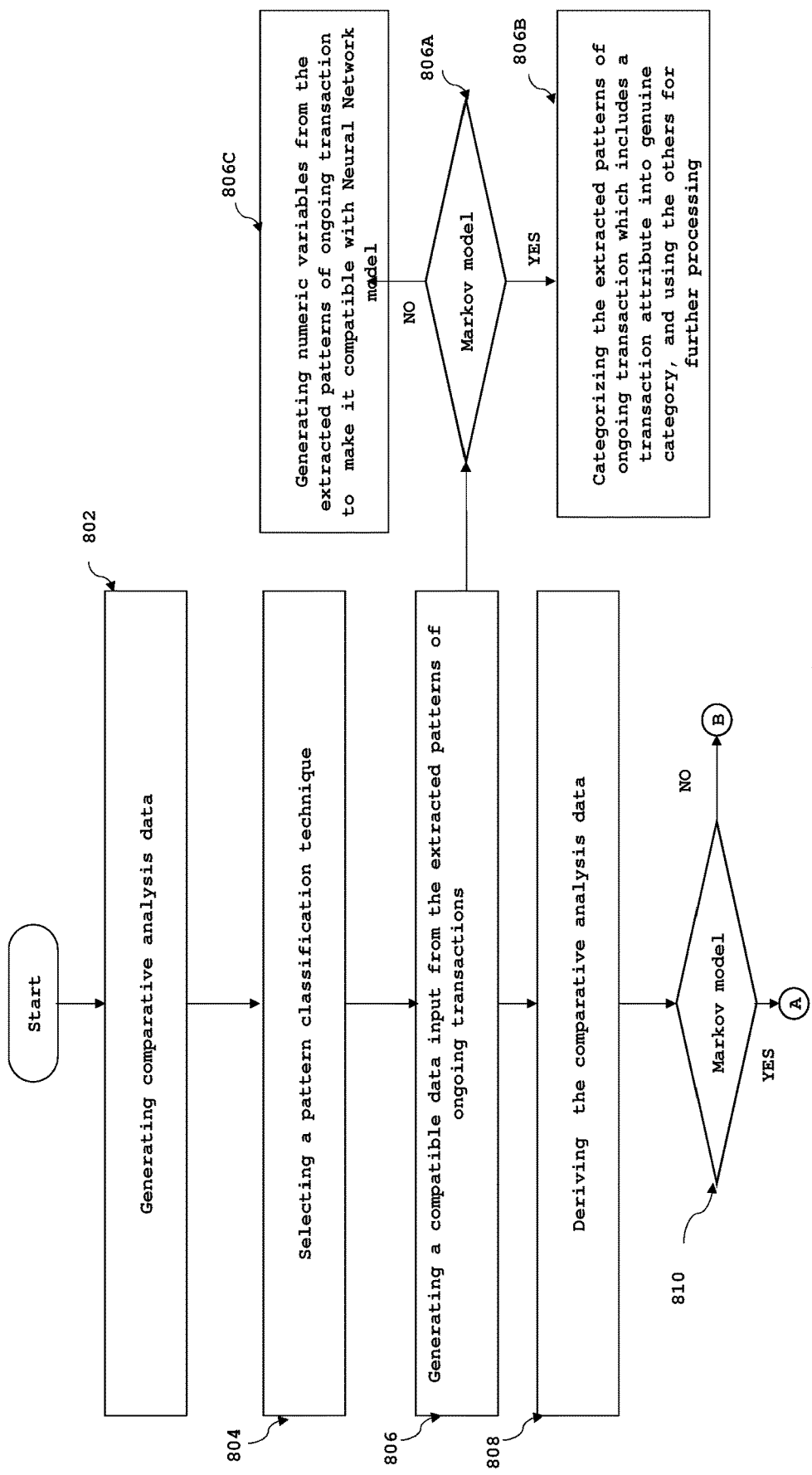
Figure 8A:
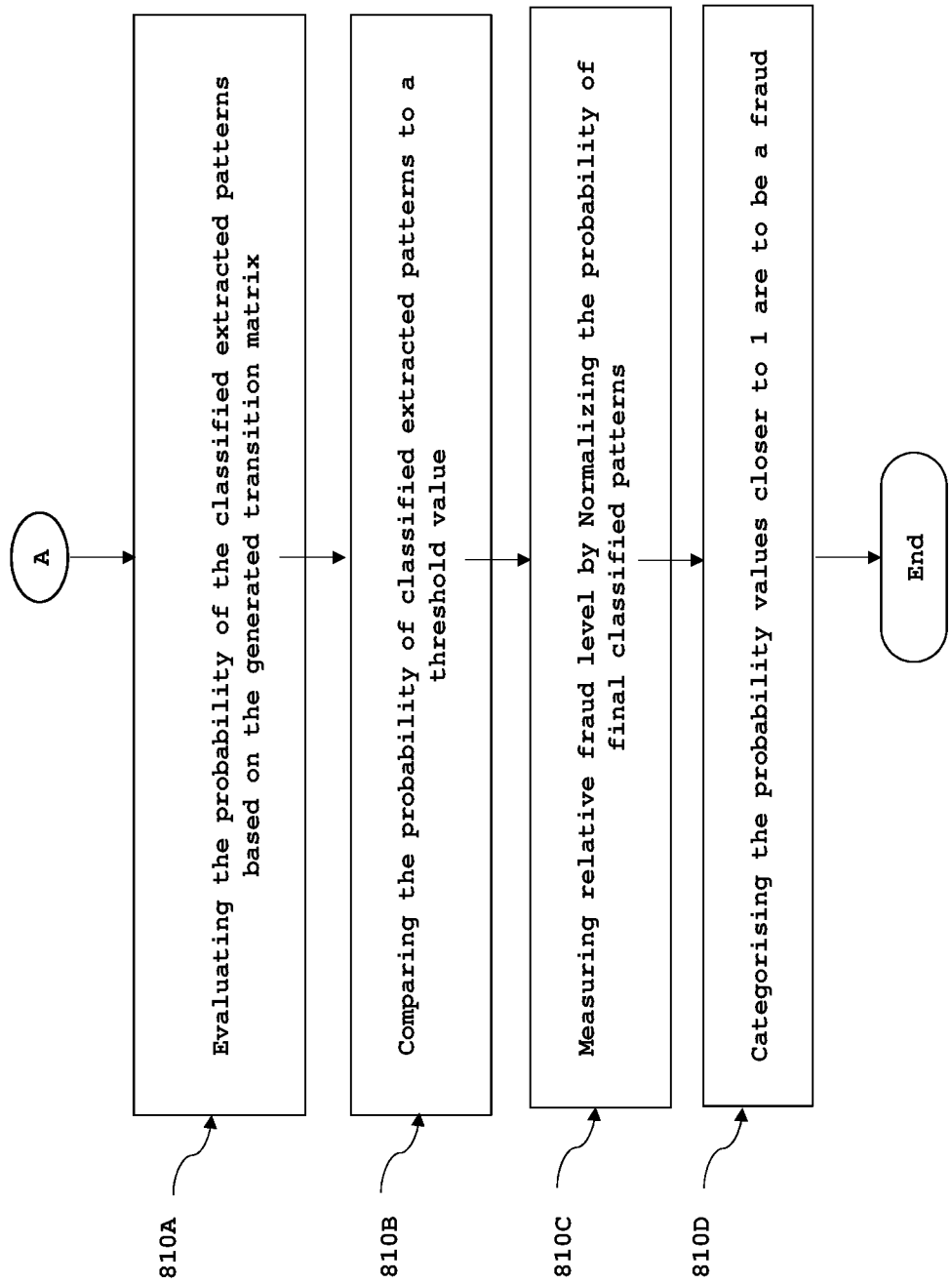
Figure 8B:
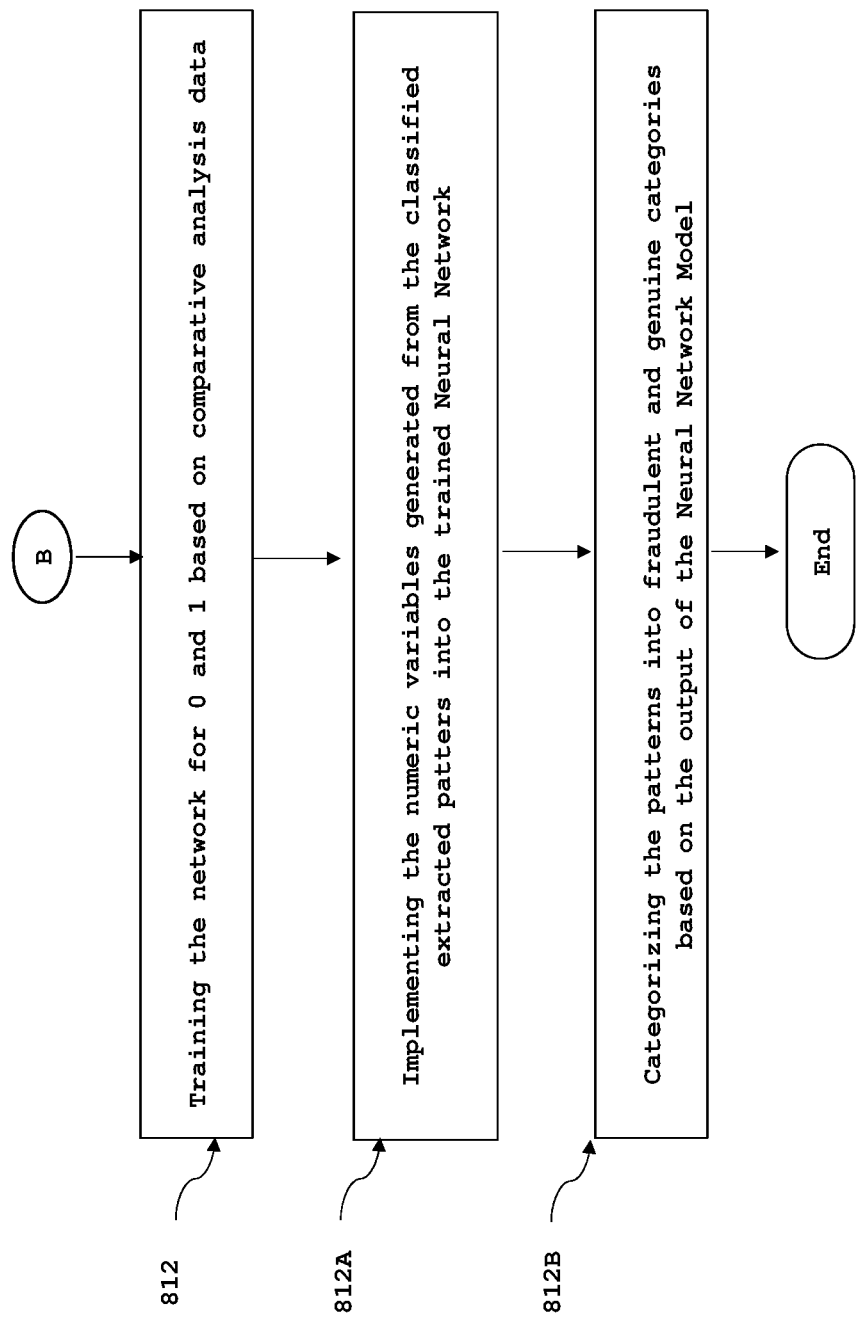
Figure 9:
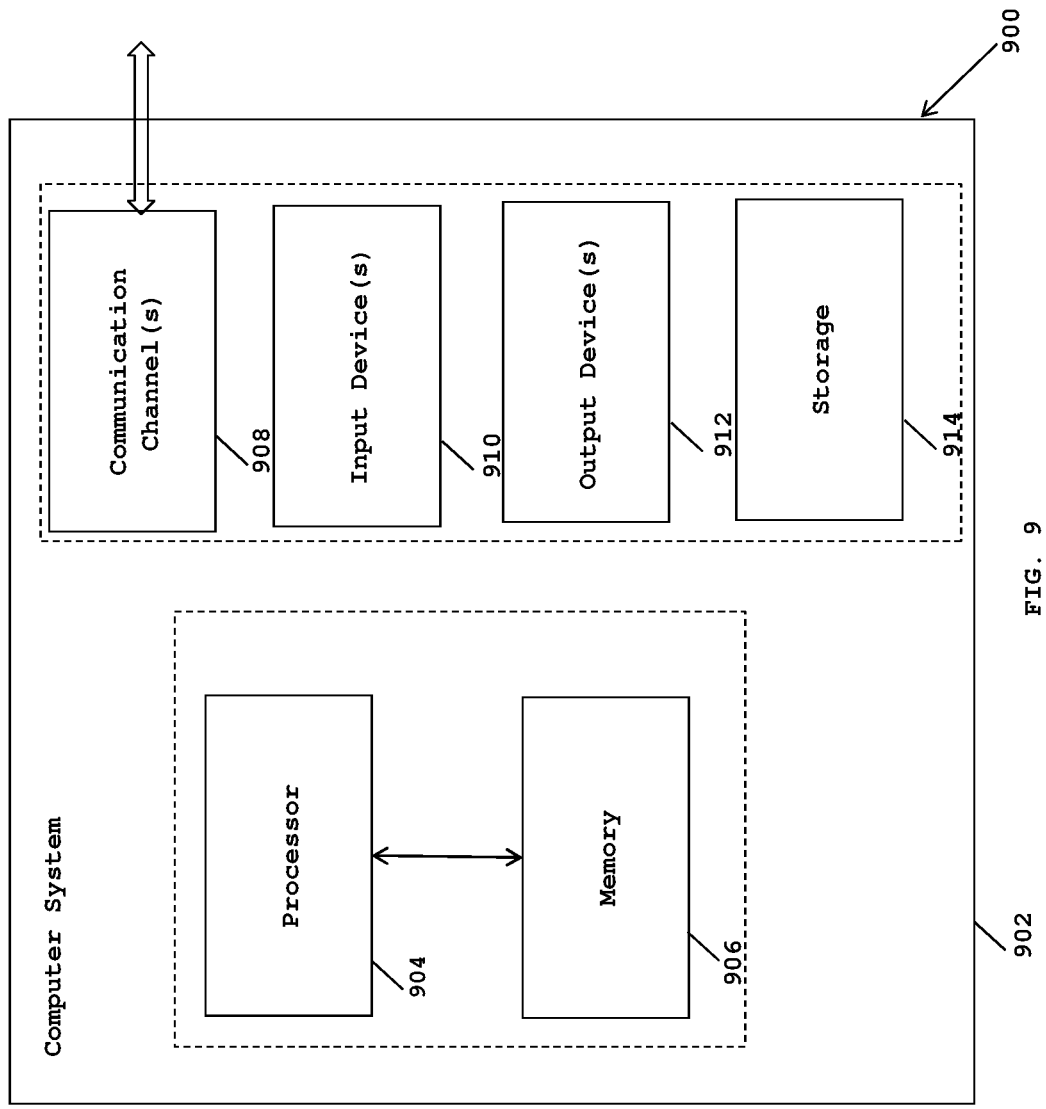

FIGS. 8, 8A, and 8B provide a flowchart illustrating a method for categorizing the extracted patterns of ongoing transaction into a fraudulent transaction or a genuine transaction, in accordance with various embodiments of the present invention in conjunction with the block diagram of FIG. 2; and FIG. 9 illustrates an exemplary computer system in which various embodiments of the present invention may be implemented.

DETAILED DESCRIPTION OF THE INVENTION

The present invention discloses a system and a method for detecting fraudulent transactions at a transaction site by analyzing pattern of events associated with one or more transactions. The present invention provides for forming a collection of most probable fraudulent patterns and true patterns associated with one or more transactions, selecting a pattern classification technique, generating a data input from an ongoing transaction that is interpretable by the selected pattern classification technique, and effectively and efficiently categorising ongoing transaction into fraudulent and genuine transactions using selected pattern classification technique. The present invention may be utilized in a variety of applications where discrete time-ordered visual events are associated with a transaction, for example: vehicles detected in relation to a transit point, badge or card swipes from an automated door lock etc., which indicate trespassing, theft and unauthorized access to restricted areas etc. with a primary focus on retail shrinkage.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
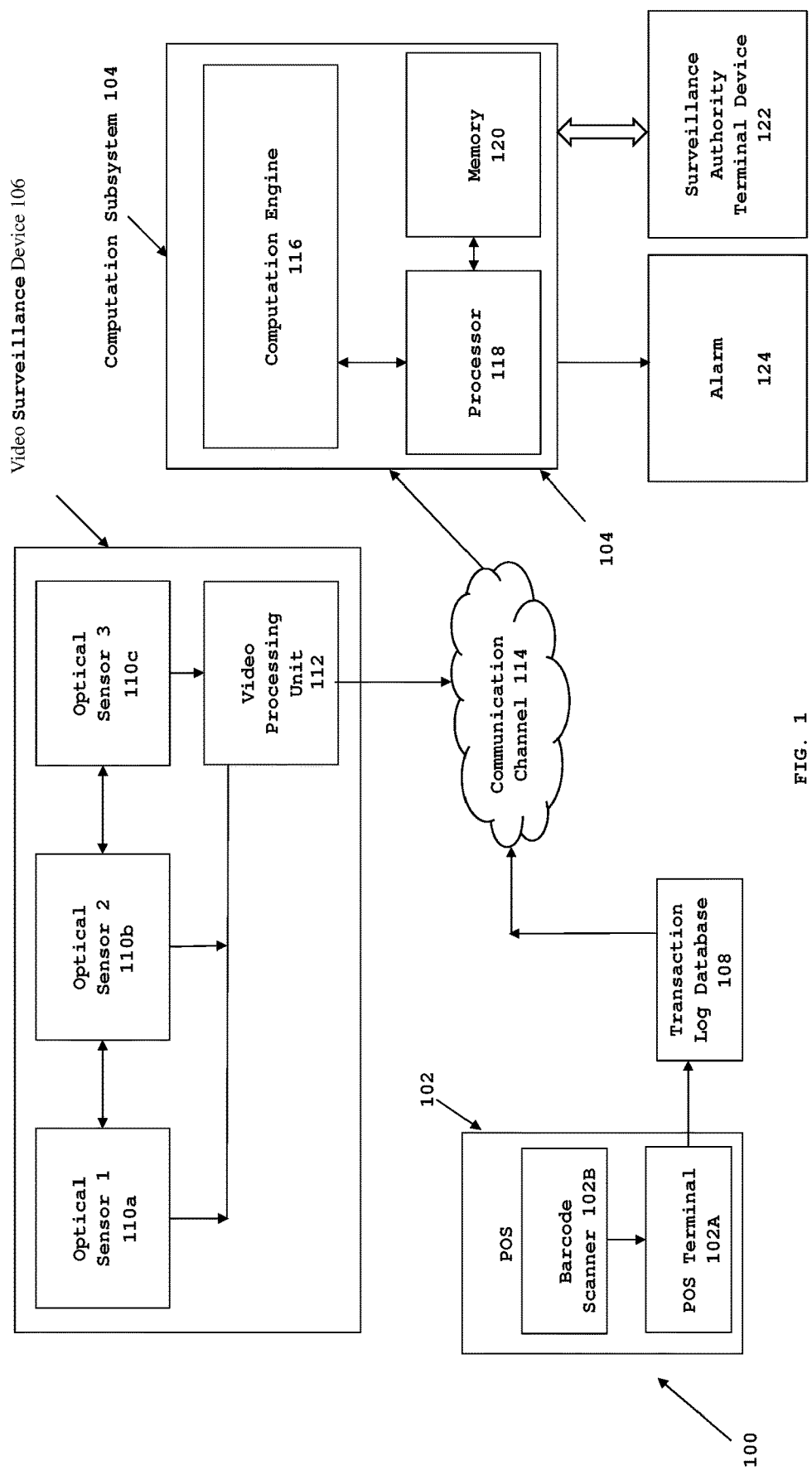
FIG. 1 illustrates a block diagram of a system for detecting fraudulent transactions which occur at a transaction site, in accordance with various embodiments of the present invention.

FIG. 1 illustrates a block diagram of a system 100 for detecting fraudulent transactions which occur at a transaction site in accordance with various embodiments of the present invention. Referring to FIG. 1, in an embodiment of the present invention, the system 100 comprises a transaction site such as a Point of Sale site (POS) 102, a computation subsystem 104, a video surveillance device 106 and a transaction log database 108. The POS site 102 may include, for example, a location at the retail site where transactions for retail goods take place. In another embodiment of the present invention, the POS site 102, may include a toll collection site to permit transit of vehicles. In another embodiment of the present invention, the POS site 102 may include a barricade site involving card swipe or token collection, for instance, at a railway station, airport etc. In an exemplary embodiment of the present invention, as shown in FIG. 1, the POS site 102 is a check-out area of a store. The POS site 102 comprises a POS terminal 102A and a scanner 102B. Examples of POS terminal 102A may include a cash register, a computer, a tablet or other device capable of cash registration and bill generation. Examples of the scanner 102B may include a barcode scanner. The POS site 102 may further include a counter, a conveyor belt, and a credit card reader (not shown). Embodiments of the present disclosure are not limited to a particular POS site 102 location or a particular item at the POS.

The scanner 102B which may be a barcode scanner is operably connected to the POS terminal 102A for generation of bill and transaction log data. The transaction log data includes barcode of each item which is sold at the POS site 102. Each time an item is sold the associated barcode is scanned by the scanner 102B at the POS and a transaction log data is generated by the POS terminal 102B.

The transaction log data is transmitted and stored in the transaction log database 108. In various embodiments of the present invention the transaction log database 108 may be maintained in a storage server which is remote to the POS site 102, or may be maintained in a separate storage at the POS site 102. In an embodiment of the present invention, the transaction log database 108 may be located in the POS terminal 102 A. The transaction log database 108 may be updated with transaction logs in real-time.

In accordance with various embodiments of the present invention the video surveillance device 106 of the system 100 may include but is not limited to optical sensors (e.g., video cameras) 110a, 110b and 110c and a video processing unit 112. The video surveillance device 106 may also include acoustic sensors (e.g., microphones) (not shown), motion sensors (not shown), video servers (not shown), and external or internal storage (not shown). In an exemplary embodiment of the present invention as shown in FIG. 1, the video surveillance device 106 includes multiple optical sensors 110a, 110b and 110c arranged for capturing footage of customer and POS personnel from desired angles. For instance the optical sensors may be located overhead of the POS site 102 (e.g., on the ceiling of the retail site), the optical sensors may be located to a front side of the POS site 102 (e.g., on a wall of the retail site), or the optical sensors may be attached to the POS site 102. The optical sensors 110 are connected to the video processing unit 112 which converts the footage into a desired format and stores it for further use.

In an exemplary embodiment of the present invention the computation subsystem 104 interfaces with one or more video surveillance devices 106 and the transaction log database 108 over a communication channel 114. The communication channel 114 may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), a Wide Area Network (WAN). The computation subsystem 104 may be located at the POS site 102 or may be located at a site remote to the POS site 102, i.e., in a separate room or a building.

Further, the computation subsystem 104 comprises a computation engine 116, a processor 118 and a memory 120. The computation engine 116 is a self-learning engine configured to automatically analyze complex data, extract patterns of events associated with one or more transactions, filter patterns and categorise patterns into fraudulent or genuine transactions. The categorised patterns may be maintained and implemented by the computation engine 116 for future transactions in order to provide speed, precision and superior performance.

In various embodiments of the present invention, the computation engine 116 is configured to receive data from the video surveillance device 106 and the transaction log database 108. Said data obtained from the video surveillance device 106 and transaction log database 108 may include information pertaining to one or more previously occurred transactions and ongoing transactions. In particular, the said data includes events associated with previously occurred transactions and ongoing transactions. Further, computing engine extracts relevant patterns from said data and processes the extracted patterns to detect fraudulent transactions.

In an embodiment of the present invention, the data collected with respect to previously occurred transactions is processed and stored as a first set of data (referred to as comparative analysis data). The comparative analysis data is generated by the computation engine 116 in the manner as discussed herein below. The computation engine 116 generates a first time-ordered string comprising discrete text labels from said data. The generated first string includes various patterns of events that occur during one or more transactions. A discrete text label in the string represents a discrete event which occurs during a transaction. One of the discrete text labels is representative of an event of successful transaction. Each of the text labels in the string are arranged based on the order of occurrence of the respective event during the transaction. Using the generated time-ordered string of discrete text labels the computation engine 116 analyzes the pattern of events associated with one more transactions that occur within said generated time-ordered string of discrete text labels.

The computation engine 116 is further configured to parse the first time-ordered string of discrete text labels using a first set of rules. Based on the first set of rules the pattern of events within the generated string are categorized into true pattern substrings representing successful transactions and false pattern substrings representing fraudulent transactions. The categorized pattern substrings are further processed by the computation engine 116 using one or more pattern classification techniques to generate a comparative analysis data, which is a collection of most probable fraudulent patterns and true patterns associated with a transaction.

In another embodiment of the present invention, the computation engine 116 is configured to retrieve video surveillance data and transaction log data pertaining to ongoing transactions. The computation engine 116 generates a new time-ordered string of discrete text labels representing ongoing transactions. This new time-ordered strings of discrete text labels (referred to as second time-ordered string of discrete text labels) correspond to ongoing transactions that are carried out at a transaction site. The second time-ordered string representing ongoing transactions is partially-filtered and processed as per a second set of rules to extract patterns of events associated with one or more ongoing transactions. The extracted patterns of ongoing transaction are implemented as input along with the comparative analysis data into one of the pattern classification techniques. The pattern classification techniques are selected on the basis of complexity of the extracted patterns of ongoing transactions. The computing engine 116 processes the input data and categorizes the extracted patterns of ongoing transaction into a fraudulent transaction or a genuine transaction. Based on the category to which the extracted patterns of ongoing transactions are assigned the computation engine 116 invokes the fraud detection alarms 122 or sends an alert to a surveillance authority terminal device 124. In various embodiments of the present invention the computation engine 116 is configured to use multiple pattern classification techniques including Neural Network and Markov Model in combination with Teiresias, a pattern detection method adopted from bio-informatics, to categorize fraudulent and genuine transactions. Throughout the specification the terminology time-ordered string of discrete text labels and time-ordered string of discrete labels has been used interchangeably.

The computation engine 116 has multiple units which work in conjunction with each other to analyze the pattern of events associated with one or more transactions to detect fraudulent transactions. The various units of the computation engine 116 are operated via the processor 118 specifically programmed to execute instructions stored in memory 120 for executing respective functionalities of the units of the subsystem 104 in accordance with various embodiments of the present invention.

In another embodiment of the present invention, the subsystem 104 may be implemented in a cloud computing architecture in which data, applications, services, and other resources are stored and delivered through shared datacenters. In an exemplary embodiment of the present invention, the functionalities of the subsystem 104 are delivered to the surveillance authority terminal device 122 as software as a service (SAAS) over the communication network 114.

In another embodiment of the present invention, the subsystem 104 may be implemented as a client-server architecture, wherein the surveillance authority terminal 122 is connected with the video surveillance device 106 and the transaction log database 108. The surveillance authority terminal device 122 accesses a server hosting the subsystem 104 over a communication network 114. The client terminals may include but are not limited to a smart phone, a computer, a tablet, microcomputer or any other wired or wireless terminal. The server may be centralized or a decentralized server.

In an exemplary embodiment of the present invention the surveillance authority terminal 122 may be configured with a user interface (not shown) of the computational subsystem 104 to facilitate the authorities retrieve the analyzed data, detailed reports of the theft events etc. The user-interface (not shown) may be customized as per the site of application of the system 100.

FIG. 2 is a detailed block diagram of the computation subsystem 202 which is configured to detect fraudulent transactions of inventory at a transaction site, in accordance with various embodiments of the present invention. The computation subsystem 202 interfaces with a video surveillance device 204 and a transaction log database 206 to receive and process input data comprising pattern of events associated with one or more transactions. Further, the computation subsystem 202 interfaces with an alarm device 208 and a surveillance authority terminal 210 to transmit the processed data which is representative of fraudulent and genuine transactions. The subsystem 202 comprises a computation engine 212, a processor 214 and a memory 216.

In an embodiment of the present invention, the computation engine 212 comprises a data processing unit 218, a pattern recognition unit 220 and an output unit 222. The data processing unit 218 is configured to retrieve data from the video surveillance device 204 and the transaction log database 206. The retrieved data is representative of events associated with one or more previously occurred transactions. The data processing unit 218 analyses the retrieved data representative of one or more previously occurred transactions, generates a first time-ordered string of discrete labels representative of patterns of events occurring during one or more transactions. The data processing unit 218 then parses the first time-ordered string of discrete text labels using a first set of rules into true pattern substrings and false pattern substrings. Further the data processing unit 218 is configured to generate a second time-ordered string of discrete labels representing ongoing transactions based on the data retrieved from video surveillance device 204 and transaction log database 206. The data processing unit 218, further partially-filters and processes the second time-ordered string as per a second set of rules to extract patterns of events associated with one or more ongoing transactions.

The processed data from the data processing unit 218, i.e. true and false pattern substrings and false pattern substrings, and extracted patterns from the second time-ordered string of discrete labels are used as an input for further computation by the pattern recognition unit 220 to categorise fraudulent and genuine transactions.

In an embodiment of the present invention, the data processing unit 218 further comprises a data collection and extraction unit 224, labelling unit 226, string generation unit 228, a string parsing unit 230 and a filtering unit 232.

The data collection and extraction unit 224 is configured to retrieve data from the video surveillance device 204 and the transaction log database 206. The retrieved data is representative of events associated with one or more transactions at a POS site 102 (FIG. 1).

In operation, in an exemplary embodiment of the present invention, at a POS site 102 (FIG. 1), the process of sale of an item generally includes four events, a) picking up an item by the POS personnel provided by a customer b) scanning the barcode or any other transaction attribute using a barcode scanner by the POS personnel (ensuring that the barcode is registered for each item that is being sold at the POS terminal), c) dropping the item in a checked out items bag by the POS personnel and finally d) registration of the scanned barcode of the item in a desired format in the transaction log database. These four events may occur one or more times during a transaction or may not occur at all. The data collection and extraction unit 224 captures images of visual events associated with the transaction (a, b and c) from the data retrieved from video surveillance device 204 and extracts the barcode of the item registered in the transaction log database 108 (FIG. 1).

In particular, in an embodiment of the present invention, the data collection and extraction unit 224 captures the images of visual events of a transaction from the data retrieved from the video surveillance device 204, and extracts a transaction attribute representative of an event of successful transaction from the data retrieved from the transaction log database 206. The transaction attribute may include a barcode which represents a successful transaction. The captured images and the transaction attribute forms the data representative of events associated with one or more transactions.

In an embodiment of the present invention, the labelling unit 226 receives the data representative of events associated with one or more transaction from the data collection and extraction unit 224. The labelling unit 226 is configured to assign discrete text labels to each of the discrete events of the transaction. The examples of text labels may include but are not limited to characters, numerals and special characters. In an exemplary embodiment of the present invention, the text labels may be in a character format. In an exemplary embodiment of the present invention, the labelling unit 226 assigns discrete text labels to the captured images of the discrete visual events and non-visual events associated with transaction of an item occurring at the POS site 102 (FIG. 1). For instance, the images of visual events which include, picking up of an item by the POS personnel provided by the customer is assigned a (P) text label, scanning the barcode or any other transaction attribute using a scanner by the POS personnel is assigned an (S) text label and dropping the item in a checked out items bag by the POS personnel assigned a (D) text label. The non-visual events which includes registration of the scanned barcode of the item in a desired format in the transaction log database is assigned a (B) text label.

Figure 3:
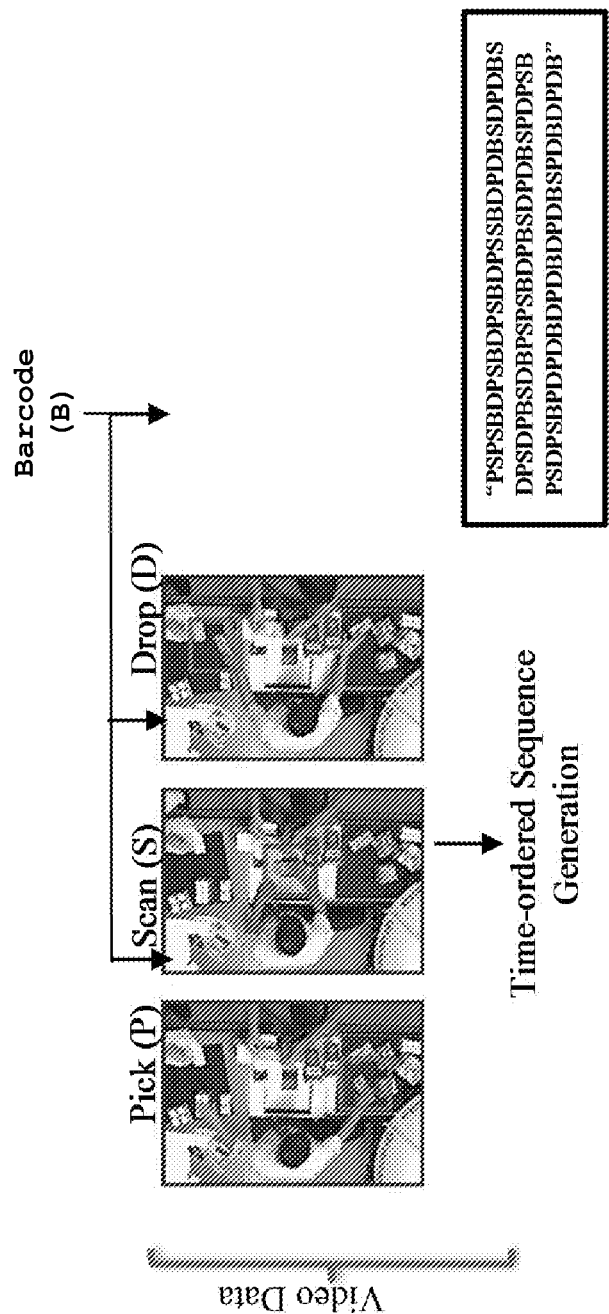
FIG. 3 depicts an exemplary illustration of generation of a time-ordered string of discrete labels P, S, D and B from video surveillance data and the transaction log data, in accordance with an exemplary embodiment of the present invention.

In an embodiment of the present invention, the string generation unit 228 receives the labelled events associated with one or more transactions from the labelling unit 226. The string generation unit 228 is configured to arrange the assigned discrete text labels in the order of occurrence of their respective events associated with one or more transactions to generate time-ordered string of discrete labels i.e. P, S, D and B. An exemplary illustration of generation of a time-ordered string of discrete labels P, S, D and B from video surveillance data and the transaction log data by the data processing unit 218 is depicted in FIG. 3.

The string parsing unit 230 receives a first time-ordered string of discrete labels generated by the string generation unit 228. The string parsing unit 230 is configured to parse the first time-ordered string of discrete text labels using a first set of rules. Based on the first set of rules the pattern of events within the generated string are categorized into true pattern substrings representing successful transactions and false pattern substrings representing fraudulent transactions. The first set of rules applied by the string parsing unit 230 are generated by employing one or more pattern discovery techniques.

In an embodiment of the present invention, the applied pattern discovery techniques may include combinatorial techniques that discover repeated patterns across a finite sequence of characters. In an exemplary embodiment of the present invention, the combinatorial techniques may include Teiresias technique.

In an embodiment of the present invention, the string parsing unit 230 is configured to categorize patterns within the first time-ordered string of discrete labels into true patterns and false patterns based on the presence of the text label corresponding to the event of registration of transaction attribute. The event of registration of transaction attribute is representative of a successful transaction. In an exemplary embodiment of the present invention, the string parsing unit 230 applies Tieresias method on the first time-ordered string of discrete labels to extract maximal patterns of events associated with one or more transactions. The maximal pattern is a pattern which satisfies a preset minimum frequency requirement in the time-ordered string of discrete labels. Further, the maximal pattern begins with a text label representative of first visual event during a transaction and ends with a text label representative of last visual event during a transaction, and also encapsulates the transaction attribute representative of successful transaction in between. The true pattern substrings are generated from these maximal patterns by applying the first set of rules associated with the Teiresias method by the string parsing unit 230. Further, the string parsing unit 230 removes the transaction attribute label from the true pattern substrings to generate false pattern substrings.

In operation, in an exemplary embodiment of the present invention, at the POS site 102 (FIG. 1) there are four events that are associated with a transaction, labelled as P for picking up of the item, S for scanning of the item, D for dropping of the item into a bag and B for registration of barcode in the transaction log database. As already explained a time-ordered string of discrete labels is generated from these labeled events. The string parsing unit 230 applies the Teiresias methodology to analyze the pattern of events associated with one or more transactions within the generated time-ordered string of discrete text labels. Based on the Teiresias method, the pattern of events within the generated string are categorized into true pattern substrings representing successful transactions and false pattern substrings representing fraudulent transactions. The Teiresias methodology applied by the string parsing unit 230 involves identifying all the maximal patterns (sub-strings) from the generated time-ordered string of discrete text labels. In an exemplary embodiment of the present invention, the string parsing unit 230 extracts all the patterns within the time-ordered string of discrete text labels which begin with P, end with D, and B encapsulated in between P and D. In this exemplary embodiment, the length of the patterns varies from 4 to 7. Further, the string parsing unit 230 selects those patterns as the maximal patterns which satisfy the minimum support, K (frequency of a pattern within time-ordered string of discrete text labels).

From these set of maximal patterns, true pattern substrings as exemplified in table 2 of FIG. 4 are formed comprising of all the patterns beginning and ending with a Pickup (P) and Drop (D) text label respectively with a single Barcode (B) label in between. The false pattern substrings as exemplified in table 1 of FIG. 4 are generated by removing the single Barcode text label from each of the true pattern substrings. It may be understood that although the embodiments of the present disclosure are described using a POS example with a series of four events in the transaction, the system of the present invention is not limited to the number of events and also the type of events.

In an embodiment of the present invention, the filtering unit 232 is configured to receive a second time-ordered string of discrete labels representing ongoing transactions from the string generation unit 228. The filtering unit 232 partially-filters and processes the second time-ordered string representing ongoing transactions as per a second set of rules to extract patterns of events associated with one or more ongoing transactions. Based on the second set of rules, those patterns within the time-ordered string of discrete labels which begin with a text label representative of first visual event during a transaction and ends with a text label representative of last visual event during a transaction, having a length varying from 4 to 7 characters are filtered out. The extracted patterns of ongoing transactions are selected for further processing by one or more pattern classification techniques i.e. Markov or Neural Network model. In an exemplary embodiment of the present invention, at a POS site 102 (FIG. 1) a second time-ordered string of discrete labels (P, S, D and B) representing ongoing transactions is generated by the string generation unit 228. The filtering unit 232 extracts all the patterns from the second time-ordered string of discrete labels which begins with a pickup label(P), ends with a Drop label(D) and whose length varies from 4 to 7 (such as PSSD, PSSBD). The extracted patterns of ongoing transaction are selected for further processing by one of the pattern classification techniques i.e. Markov or Neural Network model.

The pattern recognition unit 220 is configured to receive extracted patterns of ongoing transaction from the filtering unit 232 and true pattern substrings and false pattern substrings generated by the string parsing unit 230. The pattern recognition unit 220 categorizes the extracted patterns of ongoing transaction into fraudulent or genuine transaction on the basis of the generated true and false pattern substrings using one or more pattern classification techniques as explained herein below.

In operation in an exemplary embodiment of the present invention, the pattern classification technique applied to detect fraudulent transactions can be, for example, stochastic models such as Markov model. In some other embodiments of the invention pattern classification technique can be Neural Network model. The examples of Neural Network model may include but are not limited to Backpropagation, Hopfield net, Perceptron, Pulse-coupled Neural Networks (PCNN), Radial basis function network and Self-organizing map. In an exemplary embodiment of the present invention, the Neural Network model is backpropagation Neural Network model. In an embodiment of the present invention, the pattern recognition unit 220 further comprises a model selection unit 234, a data interpretation unit 236 and a computing unit 238.

The model selection unit 234 is configured to analyze the extracted patterns of ongoing transaction received from the filtering unit 232 and accordingly select a pattern classification technique based on the complexity of the extracted patterns of ongoing transactions. More particularly, the model selection unit 234 analyses the source (transaction site) of the extracted patterns of the ongoing transactions. If the detected transaction site is for stores that handle a diverse set of products, thereby having a higher frequency of transactions resulting in a greater variation in the data (such as supermarkets, food stores etc.) then Neural Network model is used. Neural Network model captures both the location as well as count of the labels (P, S, B and D) in the pattern and therefore is more efficient for the data having higher complexity. The model selection unit 234, selects Markov model as the pattern classification technique if the transaction site is for stores that handle similar products or single brand products, thereby having less variation in the transactions with fewer distinct SKUs (single-brand stores, boutiques etc.). Markov as a pattern classification technique focuses more on the sequence of occurrence of the labels (P, S, B and D) in the pattern. And therefore, is more efficient for data having lower complexity.

The data interpretation unit 236 is configured to convert all incoming data received from filtering unit 232 and the string parsing unit 230 into a suitable datatype compatible with one or more pattern classification techniques (Markov or Neural Network). The data interpretation unit 236 processes the categorized pattern substrings (true pattern substrings and false pattern substrings) and generates a set of inputs referred to as comparative analysis data compatible with one or more pattern classification techniques such as Markov or Neural Network model.

In an exemplary embodiment of the present invention, for Markov Model as a pattern classification technique, a transition matrix is generated based on the patterns present in the false pattern substring. The prior probability values of the elements of the transition matrix are calculated based on the occurrences of text labels like P, S, B and D after any text label i.e. a 1st Order Markov Model. In this example, a 4×4 transition matrix is created using the patterns from the false pattern substrings as shown in FIG. 5. The probability values of (P) in the transition matrix indicates the proportion of occurrence of P after P out of its total occurrences in the false patterns substrings. The probability values of (S) in the transition matrix indicates the proportion of occurrence of S after P out of its total occurrences in the false patterns substrings. The probability values of (B) in the transition matrix indicates the proportion of occurrence of B after P out of its total occurrences in the false patterns substrings. The probability values of (D) in the transition matrix indicates the proportion of occurrence of D after P out of its total occurrences in the false patterns substrings. The probability values of P, S, B and D are depicted in FIG. 5.

Further, if the selected pattern classification technique is Neural Network, the data interpretation unit 236 uses the true pattern substrings and false pattern substrings as shown in FIG. 4 as an input in order to train the Neural Network. In order to make these patterns compatible with the Neural Network model, the data interpretation unit 236 converts these patterns into a compatible data type. In an embodiment of the present invention the data interpretation unit 236 converts the true pattern substrings and false pattern substrings into numeric variables which are compatible with Neural Network pattern classification technique. The numeric variables captures the text label location and its count simultaneously in each of the true pattern and false pattern substrings. For instance considering the length of the pattern to be varying between a certain range, location variables are generated based on the location of each of the discrete text labels occurring within the true pattern and false pattern substrings respectively.

An example of the conversion of an exemplary pattern PSSBPD into numeric variables is depicted in FIG. 6. Assuming the length of the patterns in the generated true and false pattern substrings to be varying between 4 to 7, seven location variables are created based on the location of the discrete text labels P, S, D and B. Further, the count of each discrete text label in a pattern introduces count variables. For example: P, S, D and B are text labels representative of four discrete events in the pattern PSSBPD. Based on four discrete text labels, four count variables are generated which capture the count of the events P, S, D and B during a transaction in the given pattern as illustrated in FIG. 6.

Another example is shown in table 3a, FIG. 6A for pattern PSPSD from Table 1 of the false pattern substrings. Based on four discrete text labels, four count variables are generated which capture the count of the events P, S, D and B in the pattern PSPSD. The length of the pattern PSPSD is 5 where 'P' is at 1st and 3rd location, 'S' is at 2nd and 4th location and 'D' is at 5th location. So, the value for location based variables $P\_1$, $P\_3$, $S\_2$, $S\_4$ and $D\_5$ would be 1 while for the rest of the location based variables (as shown in FIG. 6A) would be 0. And, the value for count based variables Count_P, Count_S, Count_B and Count_D would be 2, 2, 0 and 1, respectively based on the number of times they have occurred in the pattern. Yet another example is shown in table 3b, FIG. 6B for pattern PSBPSD from Table 2 of the true pattern substrings. The generated numeric variables are implemented into the Neural Network method for further processing.

Yet further, the data interpretation unit 236 is configured to convert extracted patterns of ongoing transactions received from the filtering unit 232 into a datatype compatible with the selected pattern classification technique. For instance, if the selected pattern classification technique is Markov, the extracted patterns of ongoing transaction which includes a transaction attribute are classified into genuine category and are not fed for further processing, while rest of the patterns are used as an input for further processing by the computing unit 238. In another instance, if the selected pattern classification technique is Neural Network then the the data interpretation unit 236 converts extracted patterns of ongoing transactions received from the filtering unit 232 into numeric variables (as described above) which are compatible with Neural Network pattern classification technique.

The computing unit 238 is configured to process the data received from the data interpretation unit 236 and categorize the extracted patterns of ongoing transactions into a fraudulent transaction or a genuine transaction by applying one or more pattern classification techniques such as Markov and Neural Network. In particular, the computing unit 238 receives the compatible data (classified extracted patterns of ongoing transactions or numeric variables) from the data interpretation unit 236 and analyses it to derive the comparative analysis data (transition matrix or numeric variables of true and false pattern substrings) to be implemented with the selected pattern classification technique i.e. Markov or Neural Network.

In an exemplary embodiment of the present invention, the selected pattern classification technique is Markov, the computing unit 238 receives the classified extracted patterns and the transition matrix generated by the data interpretation unit 236 and evaluates the probability of the said patterns based on the generated transition matrix. The probability of these classified extracted patterns are then compared to a threshold value. The threshold value is determined using the assumption of equal likelihood of all the text labels after a label, and therefore, any label can occur after a label with an equal probability. For instance: in the POS example there are four distinct labels, the probability of any label to occur after a label will be 0.25. The threshold value in this example, is equal to $(0.25)n$, where n is the number of labels present in the pattern minus one. Further, if the probability value is higher than the threshold value then, the pattern is classified into Fraud category. The probability of final classified patterns are then normalized on a scale of 0 to 1 to measure the relative fraud level. The probability values closer to 1 are more likely to be a fraud than the rest of the patterns. For example: PSSD is a pattern representative of three pairs of consecutive events PS, SS and SD. The probability (fraud probability since it is derived from Fraud Pattern substrings) associated with these events from the transition matrix may be as follows: the probability of S occurring post P in PS is 0.29, the probability of S occurring post S in SS is 0.17 while probability of D occurring post S in SD is 0.57. Therefore, the probability associated with the pattern PSSD is 0.29*0.17*0.57 which is equal to 0.028101. The threshold value i.e. the equilibrium probability for this pattern would be $(0.25)3$ equal to 0.015625. The probability value associated with the pattern PSSD is higher than the threshold value, and therefore the pattern is classified into Fraud category. The probability of final classified patterns are then normalized on a scale of 0 to 1 to measure the relative fraud level. The values closer to 1 are more likely to be a fraud than the rest of the patterns.

In another exemplary embodiment of the present invention, if the pattern classification technique is Neural Network, the generated numeric variables from the true pattern and false pattern substrings are implemented into the Neural Network. The network is trained for 0 and 1 based on numeric variables generated from the true pattern and false pattern substrings respectively. In an exemplary embodiment of the present invention, the Neural Network is a Backpropagation Neural Network. The network is trained for 0 for the numeric variables generated from the true pattern substrings (table 2) such as PSBD, PBDPD etc. The network is further trained for 1 for the numeric variables generated from the false pattern substrings (table 1) such as PSD, PDPD etc.

Further the numeric variables generated from the extracted patterns of ongoing transactions are implemented into the trained neural network. The patterns are then categorised into fraudulent or genuine transactions based on the output of the Neural Network. For instance if the extracted patterns are similar to the patterns in the true pattern substrings then 0 is generated as the output, and if the extracted patterns are similar to the patterns in the false pattern substrings then 1 is generated as the output. If the output is closer to 1, then the pattern is classified as a fraud pattern and if it is closer to 0, then it is classified as a Genuine pattern.

The computing unit 238 maintains and stores the categorised patterns in the memory 216 and accordingly updates the comparative analysis data for analysing future transactions.

The output unit 222 is configured to invoke alarm 208 and send notifications to the surveillance authority terminal 210 based on the category to which the extracted patterns of ongoing transactions are assigned.

FIG. 7 is a flowchart illustrating a method for detecting fraudulent transactions which occur at a transaction site, in accordance with various embodiments of the present invention.

At step 702, a first time-ordered string of discrete text labels is generated. In an embodiment of the present invention, the video surveillance data and transaction log data associated with one or more previous transactions is retrieved. A first time-ordered string of discrete text labels is generated from the retrieved video surveillance data and transaction log data. The first time-ordered string of discrete labels is representative of one or more previous transactions. A discrete text label in the string represents a discrete event which occurs during a transaction and one of the text label is attributed to an event of successful transaction.

In an embodiment of the present invention, the retrieved data is representative of one or more previous transactions that have occurred at a POS site 102 (FIG. 1) and events associated with respective transactions. The images of visual events of a transaction from the data retrieved from the video surveillance device 204 (FIG. 2) are captured and a transaction attribute representative of an event of successful transaction is extracted from the data retrieved from the transaction log database 206 (FIG. 2). The captured images and transaction attribute from the data are representative of events associated with one or more transactions. In an exemplary embodiment of the present invention, at a POS site 102 (FIG. 1), the process of sale of an item generally includes four events, a) picking up an item by the POS personnel provided by a customer b) scanning the barcode or any other transaction attribute using a barcode scanner by the POS personnel (ensuring that the barcode is registered for each item that is being sold at the POS terminal), c) dropping the item in a checked out items bag by the POS personnel and finally d) registration of the scanned barcode of the item in a desired format in the transaction log database. These four events may occur one or more times during a transaction or may not occur at all. The images of visual events associated with the transaction (a, b and c) are captured from the data retrieved from video surveillance device 204 (FIG. 2) and the barcode of the item registered in the transaction log database 206 (FIG. 2) is extracted.

Further, discrete text labels are assigned to each of the discrete events that occur during a transaction. The examples of text labels may include but are not limited to characters, numerals and special characters. In an exemplary embodiment of the present invention, discrete text labels assigned to the captured images of the discrete visual events and non-visual events associated with transaction of an item occurring at the POS site 102 (FIG. 1). For instance, the images of visual events which include picking up of an item by the POS personnel provided by the customer is assigned a (P) text label, scanning the barcode or any other transaction attribute using a scanner by the POS personnel is assigned a (S) text label, and dropping the item in a checked out items bag by the POS personnel assigned a (D) text label. The non-visual events include registration of the scanned barcode of the item in a desired format in the transaction log database is assigned a (B) text label. Assigned discrete text labels are arranged in the order of occurrence of their respective events associated with one or more transactions to generate a time-ordered string of discrete labels (for example: 'PSDBSSDBPSPDBDPPDSBPDBSD'). It may be noted that some of the events such as registration of transaction attribute may not be in order due to time lag. The registration of barcode may include time lag due transmission delay to the transaction log database. For example: A delay in the arrival of barcode might result in patterns such as PSDB, PSDPSBS, etc. Delay can also arise when some items such as organic produce including vegetables and fruits, have to be manually registered at the POS after scanning. Sometimes, an item has to be scanned more than once before a successful barcode registration. Representative patterns for the same may be for example PSSBD, PSDSDB etc.

At step 704, true pattern substrings and false pattern substrings are generated. In an embodiment of the present invention, the pattern of events associated with one or more transactions that occur within the generated first time-ordered string of discrete labels are analyzed. The first time-ordered string of discrete text labels is parsed by applying a pattern discovery technique such as Teiresias into true pattern substrings representing successful transactions and false pattern substrings representing fraudulent transactions.

In an exemplary embodiment of the present invention, a pattern discovery technique such as Tieresias method is applied on the first time-ordered string of discrete labels to extract maximal patterns of events associated with one or more transactions. A maximal pattern is a pattern which satisfies a preset minimum frequency requirement in the time-ordered string of discrete labels. Further, the maximal pattern begins with a text label representative of first visual event during a transaction and ends with a text label representative of last visual event during a transaction, and also encapsulates the transaction attribute representative of successful transaction in between. In an exemplary embodiment of the present invention, at a POS site 102 (FIG. 1), a first time-ordered string of discrete text labels is generated based on four events of transaction, labelled as P, S, D and B. Here P refers picking of an item, S refers scanning of the item, D refers to dropping an item, and B refers to barcode registration. The Teiresias methodology applied involves identifying all the maximal patterns (sub-strings that repeat across transactions) from the generated time-ordered string of discrete text labels (PSDBSSDBPSPDBDPPDSBPDBSD). All the patterns associated with one or more transactions are filtered from the time-ordered string with the parameter L=4:7, which begins with a Pickup (P) text label, ends with a Drop (D) text label and contains a Barcode (B) text label. Further, those patterns which satisfy the minimum support, K (frequency of a particular pattern in the string, for example: K=2) are selected as maximal patterns.

From these set of maximal patterns, a True Pattern table as illustrated in (table2) FIG. 4 is formed comprising of all the patterns beginning and ending with a Pickup (P) and Drop (D) text label respectively with a single Barcode (B) label in between. The selected patterns are representative of single item checkout. The variations in the process of checking out of an item is represented as a combination of discrete text labels. Most of the patterns are genuine patterns with a transaction attribute (barcode) being registered for each successful transaction. Therefore patterns that are repeated across more than one transaction and have transaction attributes within them can be thought of as corresponding to genuine patterns and are categorised as true pattern substrings.

The text label which is representative of transaction attribute is removed from the true pattern substrings to generate false pattern substrings. Conceptually, a fake scan or a fraudulent item checkout is similar in essence to a genuine checkout except that the transaction attribute is not registered in the transaction log database 206 (FIG. 2). Therefore, a model representing fraudulent transactions is generated from the model representing true transactions by discarding the transaction attribute label from the true pattern substrings. For Example: the false pattern table as shown in (Table 1) FIG. 4 is constructed by removing the Barcode (B) text label from the patterns in the true pattern table (Table 2, FIG. 4).

At step 706, a set of comparative analysis data is generated by processing the true pattern and false pattern substrings. In an embodiment of the present invention, the comparative analysis data is a collection of most probable fraudulent patterns and true patterns associated with a transaction. The comparative analysis data is obtained from the first time-ordered substring of discrete labels. The comparative analyses data is implemented into one or more pattern classification techniques such as Markov or Neural network. In various embodiments of the present invention a transition matrix based on the false pattern substrings is generated as an input for Markov model and numeric variables are generated from true pattern and false pattern substrings as an input for Neural Network model. Step 708 is explained in detail in FIG. 8 (Step 802).

At step 708, a second time-ordered string of discrete text labels is generated. In an embodiment of the present invention, the video surveillance data and transaction log data associated with one or more ongoing transactions is retrieved. A second time-ordered string of discrete text labels is generated from the retrieved video surveillance data and transaction logs data. The second time-ordered string of discrete labels is representative of one or more ongoing transactions. A discrete text label in the string represents a discrete event which occurs during a transaction and one of the text label is attributed to an event of successful transaction. The second time-ordered string of discrete variables is generated in a similar manner in which the first time-ordered string of discrete variables is generated, as described in step 702.

At step 710, patterns of events associated with one or more ongoing transactions are extracted. In an embodiment of the present invention, the second time-ordered string of discrete labels representing ongoing transactions is partially-filtered and processed as per a second set of rules to extract patterns of events associated with one or more ongoing transactions. Based on the second set of rules, those patterns within the time-ordered string of discrete labels which begin with a text label representative of first visual event during a transaction and ends with a text label representative of last visual event during a transaction, having a length varying from 4 to 7 characters are extracted. The extracted patterns of ongoing transactions are selected for further processing by one or more pattern classification techniques i.e. Markov or Neural Network.

At step 712, a pattern classification technique is selected. In an embodiment of the present invention, the extracted patterns of ongoing transaction are analyzed and accordingly a pattern classification technique is selected. In an embodiment of the present invention, the pattern classification technique may include Markov or Neural Network method which is selected based on the complexity of patterns extracted from the second time-ordered string.

At step 714, a compatible data input is generated from the extracted patterns of ongoing transactions with respect to the selected pattern classification technique. In various embodiments of the present invention, if the selected pattern classification technique is Markov, the extracted patterns of ongoing transaction which includes a transaction attribute are classified into genuine category and are not fed for further processing, while rest of the patterns are used as an input for further processing. If the selected pattern classification technique is Neural Network then the extracted patterns of ongoing transactions are converted into numeric variables (as described above) which are compatible with Neural Network pattern classification technique.

At step 716, extracted patterns of ongoing transaction are categorized into a fraudulent transaction or a genuine transaction. In an embodiment of the present invention, the compatible input data i.e. classified extracted patterns of ongoing transactions or numeric variables are implemented as an input along with the comparative analysis data into the selected pattern classification techniques. The input data is processed and the extracted patterns of ongoing transaction are categorized into a fraudulent transaction or a genuine transaction.

At step 718, the comparative analysis data is updated with the categorised transactions i.e. pattern of fraudulent transaction and true transaction. In an exemplary embodiment of the present invention, the categorised patterns are stored and maintained in a memory and the comparative analysis data is updated for analysing future transactions. Further, the method steps 708 to 718 are repeated.

FIGS. 8, 8A, and 8B provide a flowchart illustrating a method for categorizing the extracted patterns of ongoing transaction into a fraudulent transaction or a genuine transaction, in accordance with various embodiments of the present invention.

At step 802, a comparative analysis data is generated. In an embodiment of the present invention, the categorised patterns substrings i.e. true pattern substrings and false pattern substrings are processed. Further, a set of inputs referred to as comparative analysis data compatible with one or more pattern classification techniques such as Markov or Neural Network is generated. The incoming data is converted into a suitable datatype based on the pattern classification technique. In various embodiments of the invention a transition matrix based on false pattern substrings is generated as an input for Markov model. The prior probability values of the transition matrix are calculated based on the occurrences of text labels like P, S, B and D after any text label i.e. a 1st Order Markov Model. In this example a 4×4 transition matrix is created using the patterns from the False Pattern substrings as shown in FIG. 4. Further, if the selected pattern classification technique is Neural Network, the true pattern substrings and false pattern substrings are used as an input. In an embodiment of the present invention the true pattern substrings and false pattern substrings are converted into numeric variables which are compatible with Neural Network pattern classification technique. The numeric variables captures the text label location and its count simultaneously in each of the true pattern and false pattern substrings. For instance considering the length of the pattern to be varying between a certain range, location variables are generated based on the location of each of the discrete text labels occurring within the true pattern and false pattern substrings respectively.

At step 804, a pattern classification technique is selected. In an embodiment of the present invention, the extracted patterns of ongoing transactions are analyzed and a pattern classification technique is selected based on the complexity of the extracted patterns of ongoing transactions.

At step 806, a compatible data input is generated from the extracted patterns of ongoing transactions with respect to the selected pattern classification technique extracted patterns of ongoing transactions. At step 806A, if the selected pattern classification technique is Markov, the extracted patterns of ongoing transaction which includes a transaction attribute are classified into genuine category and are not fed for further processing, while rest of the patterns are used as an input for further processing(step 806B)

If the selected pattern classification technique is Neural Network then the extracted patterns of ongoing transactions are converted into numeric variables (as described above) which are compatible with Neural Network pattern classification technique (step 806C)

At step 808, comparative analysis data is derived. In an embodiment of the present invention, the compatible data (classified extracted patterns of ongoing transactions or numeric variables) is analysed to derive the comparative analysis data (transition matrix or numeric variables of true and false pattern substrings) to be implemented with the selected pattern classification technique i.e. Markov or Neural Network.

At step 810, probability of the classified extracted patterns is evaluated. In an embodiment of the present invention, if the selected pattern classification technique is Markov, the classified extracted patterns and the transition matrix are applied as input and the probability of the classified extracted patterns based on the generated transition matrix is evaluated at step 810 A.

At step 810B, probability of these classified extracted patterns are compared to a threshold value, and if the probability value is higher than the threshold value then, the pattern is categorized as Fraud transaction.

At step 810C, a relative fraud level is measured. In an embodiment of the present invention, the probability of final classified patterns (pattern which cross the equilibrium threshold) are normalized on a scale of 0 to 1 to measure the relative fraud level.

At step 810D, the final classified patterns with probability values closer to 1 are categorized as fraudulent transactions.

At step 812, the Neural Network model is trained for 0 and 1. In an embodiment of the present invention, if the pattern classification technique is Neural Network, the generated numeric variables from the true pattern and false pattern substrings are implemented into the Neural Network model. The network is trained for 0 and 1 based on numeric variable generated from the True Pattern and False Pattern substrings respectively (comparative analysis data).

At step 812A, further the numeric variables generated from the classified extracted patterns are implemented into the trained Neural Network.

At step 812B, the patterns are categorized into fraudulent and genuine categories based on the output of the Neural Net Model. If the output is closer to 1, then the pattern is classified as a fraud pattern and if the output is closer to 0, then the pattern is classified as a genuine pattern.

FIG. 9 illustrates an exemplary computer system in which various embodiments of the present invention may be implemented. The computer system 902 comprises a processor 904 and a memory 906. The processor 904 executes program instructions and is a real processor. The computer system 902 is not intended to suggest any limitation as to scope of use or functionality of described embodiments. For example, the computer system 902 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 906 may store software for implementing various embodiments of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 910 may include, but not limited to, a keyboard, mouse, pen, joystick, trackball, a voice device, a scanning device, touch screen or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 302.

The storage 914 may include, but not limited to, magnetic disks, magnetic tapes, CD-ROMs, CD-RWs, DVDs, flash drives or any other medium which can be used to store information and can be accessed by the computer system 902. In various embodiments of the present invention, the storage 914 contains program instructions for implementing the described embodiments.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for detecting fraudulent transactions which occur at a transaction site, performed by a computation engine interfacing with one or more video surveillance devices and a transaction log database, the computation engine executing instructions stored in a memory via a processor, said method comprising:

generating, by the computation engine, a first time ordered discrete text label string from video surveillance data and transaction log data associated with one or more previous transactions, wherein the first time-ordered discrete text label string is representative of one or more previous transactions;

generating, by the computation engine, one or more true pattern substrings and false pattern substrings by parsing the first time-ordered discrete text label string using a first set of rules, wherein each true pattern substring represents a successful transaction and each false pattern substring represents a fraudulent transaction;

generating, by the computation engine, a set of comparative analysis data by processing the true pattern and false pattern substrings, wherein the comparative analysis data is a collection of most probable fraudulent patterns and true patterns associated with a transaction;

generating, by the computation engine, a second time-ordered discrete text label string from the video surveillance data and transaction log data associated with one or more ongoing transactions, wherein the second time-ordered discrete text label string is representative of one or more ongoing transactions;

extracting, by the computation engine, patterns of events associated with one or more ongoing transactions from the second time-ordered discrete text label string based on a second set of rules;

selecting, by the computation engine, a pattern classification technique based on analysis of complexity of the extracted patterns;

generating, by the computation engine, a compatible data input from the extracted patterns of ongoing transactions based on the selected pattern classification technique, wherein the compatible data input is the data that is interpretable by the selected pattern classification technique; and categorizing, by the computation engine, the extracted patterns of ongoing transaction into a fraudulent transaction and a genuine transaction, wherein the categorization is performed based on the comparative analysis data and the compatible data input employed by the selected pattern classification technique.

2. The method as claimed in claim 1, wherein the step of generating the first and the second time-ordered discrete text label strings by the computation engine comprises:

capturing images of visual events of a transaction from the data retrieved from the video surveillance device and extracting a transaction attribute representative of an event of successful transaction from the data retrieved from the transaction log database, wherein the captured images and the transaction attribute from the data are representative of events associated with one or more transactions; and assigning discrete text labels to each of the discrete events that occur during a transaction, wherein discrete text labels are assigned to the captured images of discrete visual events and non-visual events associated with the transaction; and arranging the assigned discrete text labels in the order of occurrence of their respective events associated with one or more transactions to generate a time-ordered discrete text label string.

3. The method as claimed in claim 1, wherein the step of generating one or more true pattern substrings and false pattern substrings, comprises:

analyzing the pattern of events associated with one or more transactions that occur within the generated first time-ordered discrete text label string;

parsing the first time-ordered discrete text label string by applying a pattern discovery technique into true pattern substrings representing successful transactions, the substrings, beginning with a text label representative of a first visual event during a transaction and ending with a text label representative of a last visual event during the transaction, encapsulating the transaction attribute in between the beginning and the ending text label is selected as a true pattern substring representative of successful transaction; and parsing the first time-ordered discrete text label string by applying a pattern discovery technique into false pattern substrings representing fraudulent transactions by removing the transaction attribute from the generated true pattern substrings.

4. The method as claimed in claim 1, wherein the step of generating a set of comparative analysis data by processing the true pattern and false pattern substrings, comprises converting true pattern substrings and false pattern substrings into a datatype based on the pattern classification technique, wherein a transition matrix based on false pattern substrings is generated as an input for Markov model and numeric variables from true pattern and false pattern substrings are generated as an input for Neural Network model.

5. The method as claimed in claim 1, wherein the second set of rules comprises extracting patterns within the time-ordered discrete text label string beginning with a text label representative of a first visual event during a transaction and ending with a text label representative of a last visual event during the transaction, and having a length varying from 4 to 7 characters.

6. The method as claimed in claim 1, wherein the step of generating a compatible data input from the extracted patterns of ongoing transactions based on the selected pattern classification technique comprises classifying the extracted patterns of ongoing transaction including a transaction attribute into a genuine category, and using the remaining patterns as an input for further processing if the selected pattern classification technique is Markov model.

7. The method as claimed in claim 1, wherein the step of generating a compatible data input from the extracted patterns of ongoing transactions based on the selected pattern classification technique comprises converting the extracted patterns of ongoing transactions into numeric variables if the selected pattern classification technique is Neural Network model.

8. The method as claimed in claim 4, wherein the step of categorizing extracted patterns of ongoing transaction into a fraudulent transaction and a genuine transaction if the selected pattern classification technique is Markov model, comprises:
- evaluating a probability of occurrence of the classified extracted patterns based on the generated transition matrix;
- comparing the probability of occurrence of the classified extracted patterns to a threshold value, wherein if the probability of the classified extracted patterns is higher than the threshold value, then, the pattern is classified as first-level fraudulent transaction;
- measuring a relative fraud level by normalizing the probability of the patterns classified as first-level fraudulent transaction on a scale of 0 to 1; and
- categorizing the final classified patterns with probability values closer to 1 as fraudulent transactions.

9. The method as claimed in claim 4, wherein the step of categorizing extracted patterns of ongoing transaction into a fraudulent transaction or a genuine transaction if the selected pattern classification technique is Neural Network, comprises:
- training the Neural Network model for 0 and 1 by implementing the generated numeric variables from the true pattern and false pattern substrings into the Neural Network model, such that the network is trained as 0 for true pattern substrings and 1 as false pattern substrings;
- implementing the numeric variables generated from the extracted patterns of the ongoing transaction into the trained Neural Network; and
- categorizing the extracted patterns into fraudulent and genuine categories based on the output of the Neural Net Model, wherein if the output is closer to 1, then the pattern is classified as a fraud pattern and if the output is closer to 0, then the pattern is classified as a genuine pattern.

10. The method as claimed in claim 1, wherein the comparative analysis data is updated with categorised transactions including pattern of fraudulent transaction and true transaction, wherein said categorised patterns are stored and maintained in a memory for analysing future transactions.

11. A system for detecting fraudulent transactions which occur at a transaction site, interfacing with one or more video surveillance devices and a transaction log database to receive and process data comprising pattern of events associated with one or more transactions, the system comprising:
- a memory storing program instructions; a processor configured to execute program instructions stored in the memory; and a computation engine in communication with the processor and configured to:
- generate a first time-ordered discrete text label string from video surveillance data and transaction log data associated with one or more previous transactions, wherein the first time-ordered discrete text label string is representative of one or more previous transactions;
- generate one or more true pattern substrings and false pattern substrings by parsing the first time-ordered discrete text label string using a first set of rules, wherein each true pattern substring represents a successful transaction and each false pattern substring represents a fraudulent transaction;
- generate a set of comparative analysis data by processing the true pattern and false pattern substrings, wherein the comparative analysis data is a collection of most probable fraudulent patterns and true patterns associated with a transaction;
- generate a second time-ordered discrete text label string from the video surveillance data and transaction log data associated with one or more ongoing transactions, wherein the second time-ordered discrete text label string is representative of one or more ongoing transactions;
- extract patterns of events associated with one or more ongoing transactions from the second time-ordered discrete text label string based on a second set of rules;
- select a pattern classification technique based on an analysis of complexity of the extracted patterns;
- generate a compatible data input from the extracted patterns of ongoing transactions based on the selected pattern classification technique, wherein the compatible data input is the data that is interpretable by the selected pattern classification technique; and
- categorize the extracted patterns of ongoing transaction into a fraudulent transaction and a genuine transaction, wherein the categorization is performed based on the comparative analysis data and the compatible data input employed by the selected pattern classification technique.

12. The system as claimed in claim 11, wherein the computation engine comprises a data processing unit in communication with the processor and said data processing unit comprises:
- a data collection and extraction unit configured to retrieve data from a video surveillance device and a transaction log database, wherein the retrieved data is representative of events associated with one or more previously occurred transactions and one or more ongoing transactions;
- capture images of visual events of a transaction from the data retrieved from the video surveillance device and extract a transaction attribute representative of an event of successful transaction from the data retrieved from the transaction log database, wherein the captured images and the transaction attribute from the data are representative of events associated with one or more transactions;
- a labelling unit configured to assign discrete text labels to each of the discrete events that occur during the transaction, wherein discrete text labels are assigned to the captured images of discrete visual events and non-visual events associated with the transaction; and
- a string generation unit configured to arrange the assigned discrete text labels in the order of occurrence of their respective events associated with one or more transactions to generate the first time-ordered discrete text label string and the second time-ordered discrete text label string.

13. The system as claimed in claim 11, wherein the computation engine comprises a data processing unit in communication with the processor and said data processing unit comprises:
- a string parsing unit configured to: analyze the pattern of events associated with one or more transactions that occur within the generated first time-ordered discrete text label string;
- parse the first time-ordered discrete text label string by applying a pattern discovery technique into true pattern substrings representing successful transactions, the substrings, beginning with a text label representative of a first visual event during a transaction and ending with a text label representative of a last visual event during the transaction, the substring encapsulating the transaction attribute in between the beginning and the ending text label, is selected as a true pattern substring representative of successful transaction;

parse the first time-ordered discrete text label string by applying a pattern discovery technique into false pattern substrings representing fraudulent transactions by removing the transaction attribute from the generated true pattern substrings; and a filtering unit configured to extract patterns of events associated with one or more ongoing transactions from the second time-ordered string of discrete text labels based on a second set of rules, wherein the second set of rules comprises extracting patterns within the time-ordered discrete text label string that begin with a text label representative of a first visual event during a transaction and ends with a text label representative of a last visual event during the transaction, and having a length varying from 4 to 7 characters.

14. The system as claimed in claim 11, wherein the computation engine comprises a pattern recognition unit in communication with the processor and said pattern recognition unit comprises:

a model selection unit configured to receive extracted patterns of ongoing transaction, analyze the received extracted patterns of ongoing transaction and select a pattern classification technique based on the complexity of the extracted patterns of ongoing transactions;

a data interpretation unit configured to convert extracted patterns of ongoing transactions into a data input compatible with the selected pattern classification technique, and generate a set of comparative analysis data by processing the true pattern and false pattern substrings interpretable with one or more pattern classification techniques; and a computing unit configured to process and categorize the extracted patterns of ongoing transactions into a fraudulent transaction or a genuine transaction by applying selected pattern classification technique.

15. A computer program product comprising:

a non-transitory computer-readable medium having computer-readable program code stored thereon, the computer-readable program code comprising instructions that, when executed by a processor, cause the processor to:

generate a first time-ordered discrete text label string from video surveillance data and transaction log data associated with one or more previous transactions, wherein the first time ordered discrete text label string is representative of one or more previous transactions;

generate one or more true pattern substrings and false pattern substrings by parsing the first time ordered discrete text label string using a first set of rules, wherein each true pattern substring represents a successful transaction and each false pattern substring represents a fraudulent transaction;

generate a set of comparative analysis data by processing the true pattern and false pattern substrings, wherein the comparative analysis data is a collection of most probable fraudulent patterns and true patterns associated with a transaction;

generate a second time ordered discrete text label string from the video surveillance data and transaction log data associated with one or more ongoing transactions, wherein the second time ordered discrete text label string is representative of one or more ongoing transactions;

extract patterns of events associated with one or more ongoing transactions from the second time ordered string of discrete text labels based on a second set of rules;

select a pattern classification technique based on analysis of complexity of the extracted patterns;

generate a compatible data input from the extracted patterns of ongoing transactions based on the selected pattern classification technique, wherein the compatible data input is the data that is interpretable by the selected pattern classification technique; and categorize the extracted patterns of ongoing transaction into a fraudulent transaction and a genuine transaction, wherein the categorization is performed based on the comparative analysis data and the compatible data input employed by the selected pattern classification technique.

16. The method as claimed in claim 6, wherein the step of categorizing extracted patterns of ongoing transaction into a fraudulent transaction and a genuine transaction if the selected pattern classification technique is Markov model, comprises:

evaluating a probability of occurrence of the classified extracted patterns based on the generated transition matrix;

comparing the probability of occurrence of the classified extracted patterns to a threshold value, wherein if the probability of the classified extracted patterns is higher than the threshold value, then, the pattern is classified as first-level fraudulent transaction;

measuring a relative fraud level by normalizing the probability of the patterns classified as first-level fraudulent transaction on a scale of 0 to 1; and categorizing the final classified patterns with probability values closer to 1 as fraudulent transactions.

17. The method as claimed in claim 7, wherein the step of categorizing extracted patterns of ongoing transaction into a fraudulent transaction or a genuine transaction if the selected pattern classification technique is Neural Network, comprises:

training the Neural Network model for 0 and 1 by implementing the generated numeric variables from the true pattern and false pattern substrings into the Neural Network model, such that the network is trained as 0 for true pattern substrings and 1 as false pattern substrings;

implementing the numeric variables generated from the extracted patterns of the ongoing transaction into the trained Neural Network; and categorizing the extracted patterns into fraudulent and genuine categories based on the output of the Neural Net Model, wherein if the output is closer to 1, then the pattern is classified as a fraud pattern and if the output is closer to 0, then the pattern is classified as a genuine pattern.

18. The system as claimed in claim 12, wherein the computation engine comprises a data processing unit in communication with the processor and said data processing unit comprises:

a string parsing unit configured to: analyze the pattern of events associated with one or more transactions that occur within the generated first time-ordered discrete text label string;

parse the first time-ordered discrete text label string by applying a pattern discovery technique into true pattern substrings representing successful transactions, the substrings, beginning with a text label representative of a first visual event during a transaction and ending with a text label representative of a last visual event during the transaction, the substring encapsulating the transaction attribute in between the beginning and the ending text label, is selected as a true pattern substring representative of successful transaction;

parse the first time-ordered discrete text label string by applying a pattern discovery technique into false pattern substrings representing fraudulent transactions by removing the transaction attribute from the generated true pattern substrings; and a filtering unit configured to extract patterns of events associated with one or more ongoing transactions from the second time-ordered string of discrete text labels based on a second set of rules, wherein the second set of rules comprises extracting patterns within the time-ordered discrete text label string that begin with a text label representative of a first visual event during a transaction and ends with a text label representative of a last visual event during the transaction, and having a length varying from 4 to 7 characters.

* * * * *